(12) United States Patent
Kang et al.

(10) Patent No.: US 12,334,511 B2
(45) Date of Patent: Jun. 17, 2025

(54) ELECTRODE, SECONDARY BATTERY COMPRISING THE SAME, AND METHOD FOR PREPARING THE SAME

(71) Applicant: SK On Co., Ltd., Seoul (KR)

(72) Inventors: Byung Chan Kang, Daejeon (KR); Yong Hee Kang, Daejeon (KR); Sung Jun Park, Daejeon (KR); Byoung Wook Jo, Daejeon (KR)

(73) Assignee: SK On Co., Ltd., Seoul (KR)

( * ) Notice: Subject to any disclaimer, the term of this patent is extended or adjusted under 35 U.S.C. 154(b) by 742 days.

(21) Appl. No.: 17/565,554

(22) Filed: Dec. 30, 2021

(65) Prior Publication Data
US 2022/0223921 A1    Jul. 14, 2022

(30) Foreign Application Priority Data

Jan. 8, 2021    (KR) .................. 10-2021-0002295

(51) Int. Cl.
*H01M 10/0587*    (2010.01)
*H01M 4/02*    (2006.01)
(Continued)

(52) U.S. Cl.
CPC ..... *H01M 10/0587* (2013.01); *H01M 4/0404* (2013.01); *H01M 4/133* (2013.01);
(Continued)

(58) Field of Classification Search
CPC ...... H01M 4/0435; H01M 4/13; H01M 4/139; H01M 10/0463; H01M 10/0525;
(Continued)

(56) References Cited

U.S. PATENT DOCUMENTS

2009/0311607 A1* 12/2009 Han .................. H01M 10/6553
429/246
2015/0244017 A1    8/2015 Nishinaka et al.
(Continued)

FOREIGN PATENT DOCUMENTS

CN    108258193 A    7/2018
CN    210349967 U  * 4/2020
(Continued)

OTHER PUBLICATIONS

English translation for CN-210349967-U (Year: 2020).*

*Primary Examiner* — Ula C Ruddock
*Assistant Examiner* — Sydney L Kline
(74) *Attorney, Agent, or Firm* — The Webb Law Firm (57) ABSTRACT

Provided is a high-density electrode and a method of manufacturing the same. An electrode for a secondary battery includes an electrode current collector, and an electrode active material layer formed on at least one surface of the electrode current collector. The electrode active material layer includes an H1 region, an H2 region and an H3 region sequentially provided from an end of the electrode active material layer toward a center. The H2 region includes an inclined section in which a thickness increases from the H1 region toward the H3 region, and the electrode satisfies the following formulas (1) and (2), $0.2 \leq h1/h2 \leq 0.7$ ... (1), $h2/h3 \geq 0.9$ ... (2), where h1 is an average thickness of the H1 region, h2 is an average thickness of the H2 region, and h3 is an average thickness of the H3 region.

14 Claims, 4 Drawing Sheets

(51) Int. Cl.
    *H01M 4/04*     (2006.01)
    *H01M 4/133*     (2010.01)
    *H01M 4/1393*     (2010.01)

(52) U.S. Cl.
    CPC .... *H01M 4/1393* (2013.01); *H01M 2004/021* (2013.01); *H01M 2004/027* (2013.01)

(58) Field of Classification Search
    CPC .. H01M 10/0585; H01M 10/058; H01M 4/23; H01M 4/00; H01M 4/22; H01M 4/02; H01M 10/0587
    See application file for complete search history.

(56)     References Cited

U.S. PATENT DOCUMENTS

| | | |
|---|---|---|
| 2019/0267608 A1 | 8/2019 | Choi et al. |
| 2020/0058962 A1 | 2/2020 | Kim et al. |

FOREIGN PATENT DOCUMENTS

| | | |
|---|---|---|
| KR | 1020180001229 A | 1/2018 |
| KR | 1020180134757 A | 12/2018 |

\* cited by examiner

ELECTRODE, SECONDARY BATTERY COMPRISING THE SAME, AND METHOD FOR PREPARING THE SAME

CROSS-REFERENCE TO RELATED APPLICATION

This application claims priority to Korean Patent Application No. 10-2021-0002295 filed Jan. 8, 2021, the disclosure of which is hereby incorporated by reference in its entirety.

BACKGROUND OF THE INVENTION

1. Field of the Invention

The present disclosure relates to an electrode, a secondary battery including the same, and a method of manufacturing the electrode. Particularly, the present disclosure relates to an electrode, a secondary battery including the electrode, and a method of manufacturing the electrode having relatively high-density.

2. Description of Related Art

An electrode of a lithium secondary battery is manufactured by coating an electrode slurry containing an electrode active material on an electrode current collector, followed by drying and rolling. However, in the process of coating the electrode slurry on the electrode current collector and drying the electrode slurry, there is a problem in which a fat edge phenomenon, in which the loading amount of the electrode slurry is high at the edge of the electrode, in the width direction thereof, may occur.

Figure 1A:
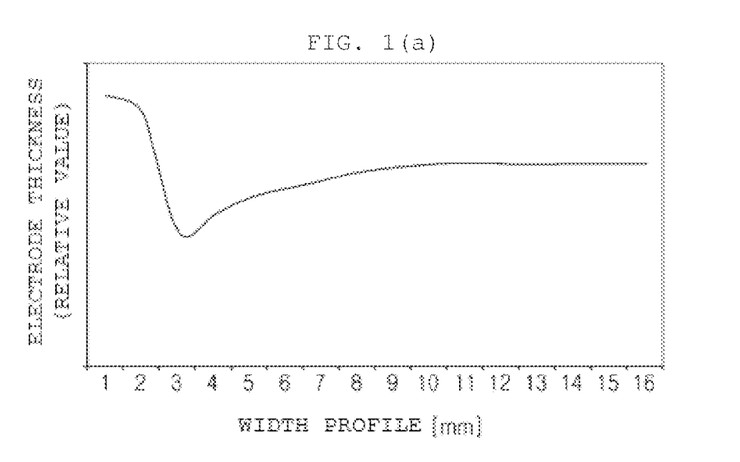
Figure 1B:
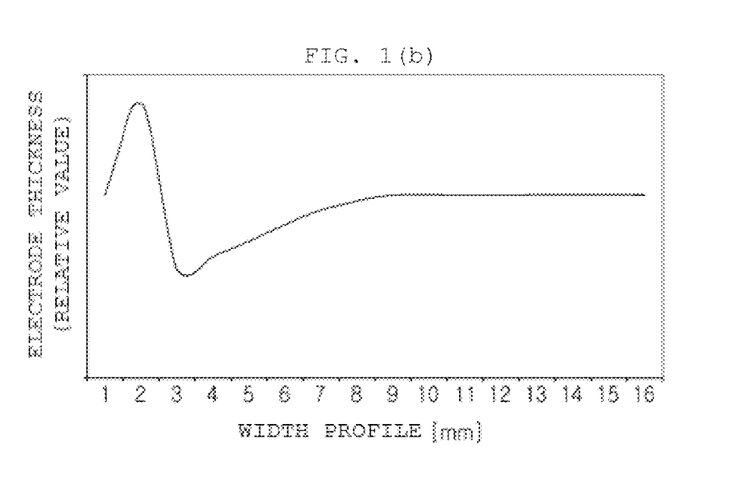

FIGS. 1(a) and 1(b) schematically illustrate the thickness distribution of the end surface in the width direction of the electrode in which the thick edge phenomenon occurs. FIG. 1(a) illustrates a thickness profile of the electrode on which the rolling process is not performed on the electrode active material layer, and FIG. 1(b) illustrates the thickness profile of the electrode after performing the rolling process.

The phenomenon of such a thick edge causes the electrode slurry to be insufficiently spread in the width direction of the electrode current collector in the coating process of coating the electrode slurry on the electrode current collector, such that the amount of electrode slurry applied in the side part of the electrode current collector is increased, and in the drying process, the drying speed is faster on the edge side compared to the center of the electrode slurry coating layer, and thus, the coating thickness of the edge becomes thick due to surface tension, and in severe cases, a convex shape (side ring) is shown.

In detail, in the case of manufacturing a high-density electrode, as the side density of the electrode increases locally, the surface of the rolling roll is contaminated due to the occurrence of a thick edge, causing deterioration of the quality of the electrode, contamination and dents on the surface of the electrode. This may further exacerbate problems such as lowering the processability for maintaining the roll surface.

In the case in which the side ring caused by the fat edge phenomenon is not severe, it is difficult to check during the electrode manufacturing process, but it may cause process problems such as electrode side cracking or contamination of the rolling roll surface due to the above-described thick edge during the rolling process. In addition, such a problem of the generation of the fat edge is not solved by the rolling process, and should be prevented in the process of coating the electrode slurry.

Accordingly, improvement is made by improving the shape of the coating shim or adjusting the gap between the die and the nozzle to reduce the overall side loading amount, but in the case in which the overall side loading amount is reduced by this method, a problem such as Li precipitation (Li-plating) in the cell due to the inversion of the N/P ratio is caused in the negative electrode, and this may cause secondary problems, such as impairing battery safety.

Furthermore, even if the side ring phenomenon as described above does not occur, in the case in which the side loading amount is high, the pressure on the side of the electrode is increased due to the bending phenomenon of the rolling roll during the rolling process, which may cause a problem of electrode side cracking.

SUMMARY OF THE INVENTION

This summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide an electrode in which a problem of a fat edge phenomenon occurring on the electrode through a local reduction in an amount of loading rather than a reduction in an overall amount of loading may be prevented, and a secondary battery including the same.

An aspect of the present disclosure is to provide an electrode in which the cracking of an electrode side does not occur during a rolling process even in the case in which a side ring phenomenon does not occur, and a method of manufacturing the same.

Furthermore, an aspect of the present disclosure is to provide an electrode in which lithium is not precipitated on an electrode surface during charging and discharging of a battery, and a method of manufacturing the same.

According to an aspect of the present disclosure, an electrode for a secondary battery includes an electrode current collector; and an electrode active material layer formed on at least one surface of the electrode current collector. The electrode active material layer includes an H1 region, an H2 region and an H3 region sequentially provided from an end of the electrode active material layer toward a center, the H2 region includes an inclined section in which a thickness increases from the H1 region toward the H3 region, and the electrode satisfies the following formulas (1) and (2), $$0.2 \leq h1/h2 \leq 0.7 \tag{1}$$

$$h2/h3 \geq 0.9 \tag{2},$$

where h1 is an average thickness of the H1 region, h2 is an average thickness of the H2 region, and h3 is an average thickness of the H3 region.

According to an aspect of the present disclosure, an electrode for a secondary battery includes an electrode current collector; and an electrode active material layer formed on at least one surface of the electrode current collector. The electrode active material layer includes an H1 region, an H2 region and an H3 region sequentially disposed from an end of the electrode active material layer toward a center, the H1 region is a region having the end of the electrode active material layer as a starting point, and any one point between 4 and 5 mm from the starting point as an endpoint, the H2 region is a region having an endpoint of the H1 region as a starting point, and any one point between 8 and 9 mm from the end of the electrode active material layer as an endpoint, and the electrode satisfies the following formulas (1) and (2), $$0.2 \leq h1/h2 \leq 0.7 \quad (1)$$

$$h2/h3 \geq 0.9 \quad (2),$$

where h1 is an average thickness of the H1 region, h2 is an average thickness of the H2 region, and h3 is an average thickness of the H3 region.

According to an aspect of the present disclosure, a secondary battery includes the electrode described above as a negative electrode or a positive electrode.

According to an aspect of the present disclosure, a method of manufacturing an electrode for a secondary battery includes a first operation of forming a coating layer by applying an electrode slurry containing an electrode active material to at least one surface of an electrode current collector; a second operation of removing a portion of the coating layer from an end of the coating layer toward a center to form an H1 region, an H2 region, and an H3 region in such a manner that an average thickness sequentially increases from the end of the coating layer; and a third operation of obtaining the electrode by rolling the coating layer. The H2 region includes an inclined section in which a thickness increases from the H1 region toward the H3 region, and the electrode satisfies the following formulas (1) and (2), $$0.2 \leq h1/h2 \leq 0.7 \quad (1)$$

$$h2/h3 \geq 0.9 \quad (2),$$

where h1, h2 and h3 are an average thickness of the H1 region, an average thickness of the H2 region, and an average thickness of the H3 region after rolling, respectively.

According to an aspect of the present disclosure, a method of manufacturing an electrode for a secondary battery includes a first operation of forming a first coating layer by applying a first electrode slurry containing an electrode active material to at least one surface of an electrode current collector; a second operation of forming a second coating layer by applying a second electrode slurry containing an electrode active material to the first coating layer to expose at least one side end of the first coating layer, and forming an H1 region, an H2 region, and an H3 region to sequentially increase an average thickness from an end of the first coating layer; and a third operation of obtaining the electrode by rolling the electrode active material layer. The H2 region includes an inclined section in which a thickness increases from the H1 region toward the H3 region, and the electrode satisfies the following formulas (1) and (2), $$0.2 \leq h1/h2 \leq 0.7 \quad (1)$$

$$h2/h3 \geq 0.9 \quad (2),$$

where h1, h2 and h3 are an average thickness of the H1 region, an average thickness of the H2 region, and an average thickness of the H3 region after rolling, respectively.

BRIEF DESCRIPTION OF THE DRAWINGS

The above and other aspects, features, and advantages of the present inventive concept will be more clearly understood from the following detailed description, taken in conjunction with the accompanying drawings, in which:

FIGS. 1(a) and 1(b) are graphs illustrating the thickness distribution of an end surface in the width direction for an electrode in which a side ring is generated by a fat edge phenomenon, and in detail, FIG. 1(a) is a thickness profile of an electrode in which a rolling process is not performed on an electrode active material layer, and FIG. 1(b) is a thickness profile of an electrode after performing the rolling process;

FIGS. 2(a) and 2(b) are views illustrating thickness profiles for a end surface of one side of an electrode in the width direction according to an embodiment, and in detail, FIG. 2(a) illustrates an example in which an H1 region does not have a distal end inclined portion, and FIG. 2(b) illustrates an example in which the H1 region has a distal end inclined portion;

FIGS. 4(a) to 4(d) are images illustrating the presence or absence of side cracks and the occurrence of lithium plating for the electrodes prepared by Example 1, Comparative Example 1 and Comparative Example 2, and in detail, FIGS. 4(a) and 4(b) illustrate electrodes prepared in Example 1, indicating that side cracking and lithium plating do not occur, FIG. 4(c) illustrates an electrode prepared in Comparative Example 1, and represents the electrode in which the side cracking phenomenon occurred, and FIG. 4(d) illustrates an electrode prepared in Comparative Example 2 and represents the electrode in which lithium plating occurred.

DESCRIPTION OF THE INVENTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided such that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

According to an embodiment of the present disclosure, a problem in which a fat edge phenomenon occurs due to an increase in the loading amount of the edge portion of the electrode active material layer during coating of the electrode slurry may be prevented. In addition, in an electrode and a method of manufacturing the same according to an embodiment of the present disclosure, a problem in which the side of the electrode is broken by the pressure of the rolling roll during the rolling process may be prevented even in the case in which the fat edge as described above does not occur, and a problem in which a lithium is deposited on the electrode during the charging and discharging process of the battery may be prevented. To this end, in the present disclosure, a method of manufacturing an electrode by locally reducing the amount of loading on the electrode side, and an electrode according to the method may be provided.

Hereinafter, the present disclosure will be described in detail with reference to the accompanying drawings.

An electrode having an electrode active material layer is manufactured by applying an electrode slurry containing an electrode active material to an electrode current collector and drying and rolling the electrode. In this case, the electrode according to an embodiment of the present disclosure is characterized in that the loading amount is locally reduced with respect to the side of the electrode by changing the thickness profile of the coating layer at the edge of the electrode.

The electrode according to an embodiment of the present disclosure includes an electrode current collector, and an electrode active material layer formed on at least one surface of the electrode current collector, and the electrode active material layer includes an H1 region, an H2 region, and an H3 region sequentially disposed from the end of the electrode active material layer toward the center. In this case, the H2 region includes an inclined section in which the thickness increases from the H1 region toward the H3 region. Accordingly, the H3 region has a thickness greater than that of the H1 region.

Figure 2A:
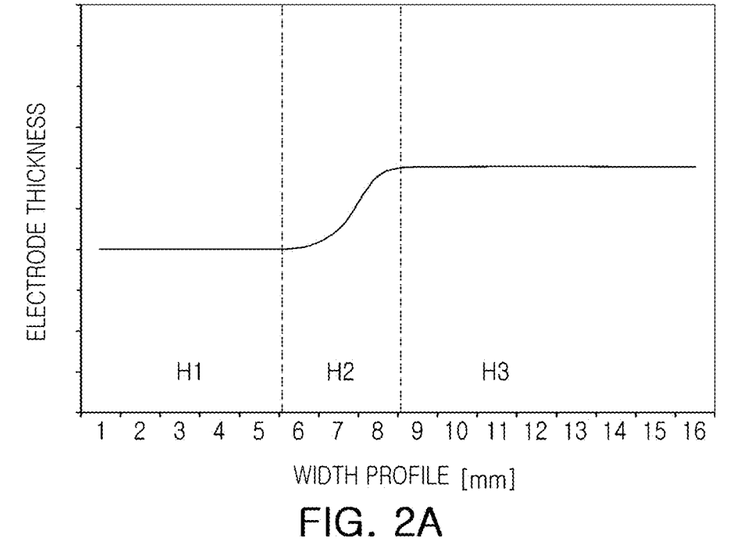

In detail, the electrode according to the first aspect of the present disclosure may have, for example, one end of the electrode active material layer having a stepped thickness profile. The end surface shape of the edge of the electrode having such a step-like thickness profile is schematically illustrated in FIG. 2(a). FIG. 2(a) illustrates an example of an ideal step shape for descriptions, but the present disclosure is not limited thereto. Therefore, in the present disclosure, having a step-shaped thickness profile means having a step difference between two or more steps, and the two or more steps should be understood as including the case of having a thickness change section in which the thickness (slope) of the electrode active material layer rapidly changes between respective stages even in a case in which each stage is not flat, as well as having the flat case.

As illustrated in FIG. 2(a), the electrode has a first stage having a relatively small thickness disposed on the side of the electrode, and a second stage having a relatively greater thickness disposed on the center side of the electrode, and an inclined section between the first stage and the second stage, and an inclined section of which a thickness changes between the first stage and the second stage.

In more detail, the electrode according to an embodiment of the present disclosure includes an electrode active material layer formed on at least one surface of the electrode current collector. In this case, the electrode material layer may be applied to the entire surface of the electrode current collector, but the electrode active material layer may be formed on only a portion of the electrode current collector, and in detail, an uncoated region may be provided at the edge of the electrode current collector.

As illustrated in FIG. 2(a), the electrode according to an embodiment has, as an example, a H1 region of the first stage having a predetermined average thickness located on at least one end of the electrode active material layer, an H3 region of the second stage having an average thickness greater than that of the H1 region, and an H2 region that connects the H1 region and the H3 region and is an inclined section in which the thickness increases from the H1 region toward the H1 region.

In this case, the electrode according to an embodiment in detail, satisfies the following Formulas (1) and (2) in relation to the thickness between regions.

$$0.2 \leq h1/h2 \leq 0.7 \quad (1)$$

$$h2/h3 \geq 0.9 \quad (2)$$

In Formulas (1) and (2), h1 represents the average thickness of the H1 region, h2 represents the average thickness of the H2 region, and h3 represents the average thickness of the H3 region.

In the above formula (1), if the value of h1/h2 is less than 0.2, for example, if the thickness of the H2 region is 5 times or more thicker than that of the H1 region, the pressure may not be dispersed to the H1 region due to the bending phenomenon of the rolling roll during the rolling process, but is concentrated in the H2 region, and thus, side cracking may occur in the H2 region. If the value of h1/h2 exceeds 0.7, since the thickness of the H1 region is relatively great, side cracking of the H1 region may occur during the rolling process.

On the other hand, in Formula (2), if the value of h2/h3 is less than 0.9, the thickness change of the H2 region is large and the average thickness is small, and lithium precipitation may occur. Meanwhile, when the average thickness of the H1 region, the H2 region, and the H3 region satisfies the relationships of the above formulas (1) and (2), preferably, the side part cracking phenomenon of the electrode active material layer does not occur, and the problem of lithium precipitation does not occur.

When the H1 region in detail, includes an end of the electrode active material layer, for example, an uncoated region, the boundary between the electrode active material layer and the uncoated region may be a starting point, and any one point between 4 and 5 mm from the starting point may be an endpoint. When the endpoint of the H1 region is within the range of 4 to 5 mm from the starting point, cracking of the electrode side due to the phenomenon in which the rolling roll is bent toward the side compared to the center of the electrode during rolling to apply relatively high pressure to the side may be prevented. At the same time, the occurrence of lithium precipitation in the cell by reversing the N/P ratio according to the decrease in electrode loading may be prevented.

The H2 region may be a region having an endpoint of the H1 region as a starting point, and any point between 8 and 9 mm from the end (the boundary between the electrode active material layer and the uncoated region and the starting point of H1) of the electrode active material layer, as the endpoint. For example, the H2 region is a section from the endpoint of the H1 region until the thickness increases to become the thickness of the center of the electrode. The electrode cracking phenomenon may be reduced, and an appropriate average thickness of the H2 region may be maintained, such that the lithium precipitation phenomenon may be prevented in the H2 region.

Also, the H3 region may have an endpoint of the H2 region as a starting point. On the other hand, with respect to the setting of the endpoint, the region after that is the region in which the electrode active material layer is usually set to have a uniform thickness, and thus, has a uniform average thickness regardless of which range is used as the endpoint, and therefore, the setting of the endpoint is not particularly limited. For example, any one point of 13 mm or more (however, the center or below of the electrode active material layer), in detail, any one point between 13 and 15 mm from the end of the electrode active material layer, may be used as an endpoint.

Expressions such as the starting point, the endpoint, and the point should be understood as not indicating any one point, but referring to a straight line including the point, and in more detail, referring to a straight line parallel to the boundary between the uncoated region and the electrode active material.

Figure 2B:
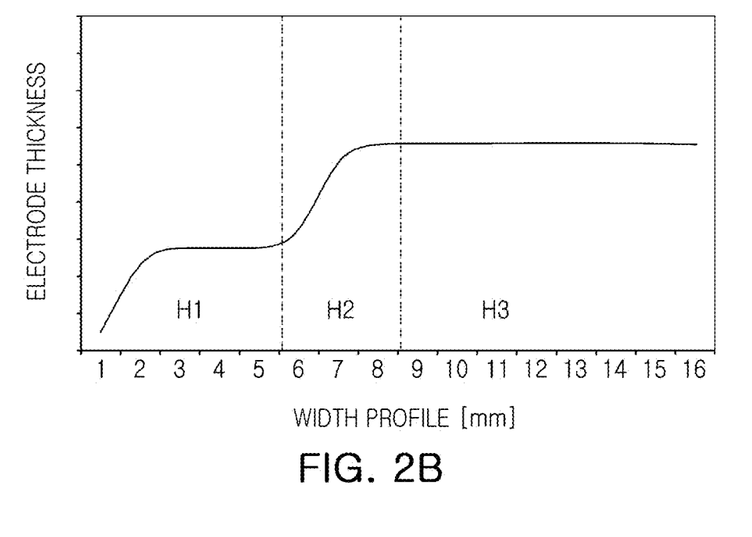

The electrode according to an embodiment of the present disclosure, for example, may have a thickness profile of the edge end surface of the electrode active material layer as illustrated in FIG. 2(b). In detail, as illustrated in FIG. 2(b), the H1 region may further include the distal end inclined portion having increasing thickness of the H1 region at the boundary between the electrode active material layer as the starting point of the H1 region and the uncoated region. The distal end inclined portion may be more in detail, formed in a region within 2 mm from the end of the electrode active material layer.

In addition, as an example of the electrode according to an embodiment of the present disclosure, as illustrated in FIGS. 2(a) and 2(b), the electrode having a step has been described as an example, but the present disclosure is not limited thereto, and as long as Formulas (1) and (2) are satisfied even in the case in which there is no step, if the required effect may be obtained in the present disclosure, this case may also be included in the scope of the present disclosure.

When the electrode according to an embodiment of the present disclosure includes, for example, an electrode active material layer formed on at least one surface of the electrode current collector, and includes an end of the electrode active material layer, for example, an uncoated region; the electrode includes the H1 region having the boundary between the electrode active material layer and the uncoated region as the starting point, and any one point between 4 and 5 mm from the starting point as the ending point, the H2 region having an endpoint of the H1 region as a starting point and any one point between 8 and 9 mm from the end of the electrode active material layer as an endpoint, and the H3 region having the endpoint of the H2 region as the starting point and any one point of 13 mm or more at the end of the electrode active material layer, in detail, any one point between 13 and 15 mm as the endpoint, and the following formulas (1) and (2) may be satisfied.

$$0.2 \leq h1/h2 \leq 0.7 \quad (1)$$

$$h2/h3 \geq 0.9 \quad (2)$$

In this case, h1, h2, and h3 represent the average thickness of the H1 region, the H2 region, and the H3 region, respectively.

When the electrode satisfies the formulas (1) and (2) as described above, the occurrence of a fat edge due to an increase in the loading amount of the electrode side during the electrode manufacturing process may be suppressed, and the occurrence of edge cracking of the electrode caused by the bending of the rolling roll during the rolling process may be prevented. Furthermore, the occurrence of lithium deposition on the electrode surface during the charging and discharging process of the battery may be suppressed.

As an electrode satisfying the above conditions, for example, the H1 region is a flat surface having a predetermined average thickness h1, the H3 region is a flat surface having an average thickness h3 thicker than the average thickness h1 of the H1 region, and the H2 region may have a step-shaped thickness profile that is an inclined section in which the thickness increases from the H1 region toward the H3 region. In addition, the H1 region and the H2 region are inclined sections in which the thickness of the electrode active material layer increases from the boundary between the electrode active material layer and the uncoated region toward the H3 region, and the H3 region may have a thickness profile having a flat surface.

An electrode having a thickness profile as described above according to each embodiment may be prepared by applying an electrode slurry containing an electrode active material on an electrode current collector or changing the thickness shape of the electrode active material layer after drying, or may be manufactured by forming a multilayer electrode. Hereinafter, a method of manufacturing the electrode according to an embodiment will be described in more detail.

The electrode provided in the present disclosure includes an electrode active material layer formed on at least one surface of an electrode current collector, and includes an electrode active material, a binder, and a solvent on the surface of the electrode current collector, and further includes a conductive agent, a thickener, and the like if necessary. The electrode active material layer is formed by applying the slurry, drying and rolling, and the electrode according to an embodiment may be manufactured by various methods.

As a first method, first, the electrode current collector is driven and the electrode slurry as described above is applied to at least one surface of the electrode current collector to form a coating layer.

In this case, the electrode slurry may be applied to a portion of the electrode current collector to form a coating layer to have an uncoated region, and the uncoated portion may be provided at one end of the electrode current collector.

The coating layer formed on the electrode current collector may be formed to have a flat thickness with respect to the surface of the electrode current collector, as is performed in related art electrode manufacturing. For example, after supplying the electrode slurry to the surface of the current collector, the electrode slurry may be evenly spread by various commonly used methods such as spreading to form a coating layer. Therefore, it may be expressed that the coating layer by the coating of the electrode slurry has a flat surface. However, the amount of electrode slurry applied to the side end surface end in the width direction in the running direction of the electrode current collector may increase to indicate a relatively high side loading amount, and in severe cases, as illustrated in FIGS. 1(a) and 1(b), a fat edge phenomenon may occur.

Accordingly, by the blading with respect to the end of the side end surface of the electrode coating layer to disperse and remove a predetermined amount of electrode slurry, forming the H1 region, H2 region and H3 region such that the average thickness sequentially increases from the end of the coating layer.

For example, when the thickness of the center of the electrode coating layer formed by the application of the electrode slurry is h3", by removing the distal end of the electrode slurry by blading, a flat surface having the thickness of h1" less than the thickness h3" of the coating layer in the center may be formed. In this case, the dispersing and removed distal end is a portion of the electrode slurry in the thickness direction from the edge of the coating layer, which is distinguished from forming the uncoated region thereby.

As an embodiment, the end surface of the edge of the coating layer may be formed in a stepped shape by the blading, or may be formed in a shape having an inclination of increasing thickness from the end of the electrode active material layer toward the center.

For example, by removing a portion of the distal end of the coating layer formed on the electrode current collector, the H1 region having an average thickness of h1" smaller than the average thickness h3" of the center of the coating layer is formed on the end of the coating layer, and the H2 region may be formed to have an average thickness of h2" further increased than h1". Thereby, sequentially from the end to the center of the coating layer, a coating layer including the H1 region having an average thickness of h1", the H2 region having an average thickness of h2" further increased than the thickness of h1", and the H3 region having an average thickness of h3" may be formed. In this case, the H2 region may be an inclined section in which the thickness increases from the H1 region toward the H3 region.

The fat edge phenomenon occurs on the end of the coating layer, for example, in a width of usually within 5 mm from the boundary (0 mm) between the coating layer and the uncoated region. In addition, if the thickness of the coating layer within 4 to 5 mm from the boundary between the uncoated region and the coating layer is relatively thick, the pressure applied due to the bending phenomenon of the rolling roll during the rolling process by the rolling roll is increased, causing cracks at the electrode edge phenomenon.

Therefore, the coating layer is removed by blading to form an H1 region within 5 mm, in detail, within 4 mm, from the end of the coating layer, and blading from any point between 8 to 9 mm from the end of the coating layer. It is preferable to perform blading such that the H2 region, which is an inclined section in which the thickness decreases from the start to the endpoint of the H1 region, is formed.

Thereafter, the coating layer is dried to form an electrode active material layer, and then the electrode active material layer is rolled to form an H1 region having an average thickness of h1, an H2 region having an average thickness of h2, and an H3 region having an average thickness of h3. An electrode having an electrode active material layer having a locally reduced thickness may be obtained.

The drying is for removing the solvent contained in the electrode slurry, and the drying means is not particularly limited, and a related art drying means may be applied, for example, heat drying such as hot air drying may be used.

The drying process is not particularly limited, but for example, may be performed in the range of 60 to 180° C., in detail, 70 to 150° C., for 20 to 300 seconds, for example, for 40 to 240 seconds, or for 60 to 200 seconds.

In addition, the rolling process is for controlling the thickness or density of the electrode mixture layer, and the rolling process may use a related art method such as a roll press method or a flat plate press method.

The thickness profile of the electrode active material layer is changed by blading of the coating layer, and an electrode having an electrode active material layer satisfying the above formulas (1) and (2) may be obtained.

As a detailed example of the first method, an electrode slurry containing an electrode active material is applied to at least one surface of an electrode current collector to form a coating layer having a predetermined thickness, in detail, an uncoated region and a coating layer, and then, a portion of the electrode slurry of the coating layer formed to any point between 8 to 9 mm from the end of the coating layer may be removed by a method such as blading.

When the average thickness of the coating layer is h3", an H1 region having an average thickness of h1" smaller than h3", from the end of the coating layer to any point between 4 and 5 mm toward the center of the coating layer, and an H2 region which has a thickness increased from the endpoint of the H1 region to any point between 8 and 9 mm from the end of the coating layer and which has an average thickness of h2" with a thickness further increased than h1" may be formed.

Then, as described above, the coating layer is dried to form an electrode active material layer, and the electrode having the electrode active material layer may be obtained, the electrode including the H1 region provided by rolling the electrode active material layer to have an average thickness of h1, the H2 region having an average thickness of h2 and an average thickness increased from the end of the electrode active material layer toward the center, and the H3 region having an average thickness of h3, and the electrode satisfying Formulas (1) and (2).

In this case, although the thickness of the H3 region may be the average thickness of the remaining section of the electrode active material layer, for example, the average thickness of the electrode active material layer with respect to the center of the electrode, the thickness of the H3 region may be an average thickness of a region in which an endpoint of the H2 region is a starting point and any one point of 13 mm or more, in detail, any one point between 13 and 15 mm is an endpoint.

As described above, the electrode obtained by the present embodiment may have a stepped thickness profile, but the configuration is not limited thereto. For example, the H1 region and the H2 region may be inclined sections having different inclinations. On the other hand, the H3 region may be a flat section, and may also include an inclined section in which the thickness increases toward the center of the electrode active material layer.

A second method of manufacturing the electrode according to an embodiment as described above will be described.

First, by running the electrode current collector, the electrode slurry as described above is applied to at least one surface of the electrode current collector to form a coating layer, and a drying process is performed to form an electrode active material layer.

The application and drying are the same as those described above, and a detailed description thereof will be omitted.

In this case, the electrode active material layer formed on the electrode current collector has an increased amount of electrode slurry applied during the coating process at the end of the side end in the H1 region, and the drying rate at the distal end of the side end of the electrode is higher than that at the center of the electrode during the drying process, and thus, the amount of side loading due to the surface tension may increase, such that a fat edge phenomenon may occur.

Accordingly, after the drying, a predetermined amount is removed by blading the distal end of the electrode active material layer to form an H1 region, an H2 region and an H3 region such that the average thickness is sequentially increased from the end of the electrode active material layer.

For example, when the thickness of the center of the electrode active material layer formed by application and drying of the electrode slurry is h3', a flat surface having a thickness of h1' that is less than the thickness of the electrode active material layer at the center, by removing the distal end of the electrode active material layer by blading, may be formed. In this case, the removed distal end portion of the electrode active material layer is a portion of the electrode active material layer in the thickness direction from the edge of the electrode active material layer, thereby being distinguished from forming the uncoated portion.

As an embodiment, the end surface of the edge of the electrode active material layer may be formed in a step shape by the blading, or may be formed in a shape having an inclination of increasing thickness from the end of the electrode active material layer toward the center. Accordingly, the end surface shape of the edge of the electrode active material layer may have a shape similar to that of the coating layer according to the first method.

For example, by removing a portion of the distal end of the electrode active material layer formed on the electrode current collector, an H1 region having an average thickness of h1' smaller than the average thickness h3' of the center of the electrode active material layer is formed at the end of the electrode active material layer, and the H2 region may be formed to have an average thickness of h2' more increased than h1'. Accordingly, an electrode active material layer including the H1 region having an average thickness of h1', the H2 region having an average thickness of h2' more increased than the thickness of h1', and the H3 region having an average thickness of h3', which are sequentially formed from the end of the electrode active material layer toward the center, may be formed. In this case, the H2 region may be an inclined section in which the thickness increases from the H1 region toward the H3 region.

The fat edge phenomenon usually occurs at a width of within 5 mm from the end of the electrode active material layer, for example, the boundary (0 mm) between the electrode active material layer and the uncoated region. In addition, if the thickness of the electrode active material layer within 4 to 5 mm from the end of the electrode active material layer is relatively thick, the pressure applied due to the curvature of the rolling roll during the rolling process by the rolling roll is increased, causing a crack phenomenon at the electrode edge.

Therefore, the electrode active material layer is removed by the blading on the electrode active material layer to form an H1 region within 5 mm, in detail, within 4 mm, from the end of the electrode active material layer, and in detail, blading from any one point between 8 to 9 mm from the end of the electrode active material layer may be started and performed to form the H2 region, which is an inclined section in which the thickness decreases to the endpoint of the H1 region.

Thereafter, the electrode active material layer is rolled to obtain an electrode having an electrode active material layer with a locally reduced thickness of the H1 region having an average thickness of h1, the H2 region having an average thickness of h2, and the H3 region having an average thickness of h3.

The thickness profile of the electrode active material layer is changed by blading of the electrode active material layer, and an electrode having an electrode active material layer satisfying the above formulas (1) and (2) may be obtained.

As a detailed example of the second method, an electrode slurry containing an electrode active material is applied to at least one surface of an electrode current collector to form a coating layer having a predetermined thickness, in detail, a coating layer and an uncoated region, and the coating layer is dried to form the electrode active material layer, and then, a portion of the electrode active material layer formed up to any point between 8 and 9 mm from the end of the electrode active material layer may be removed.

When the average thickness of the electrode active material layer is h3', the H1 region H1 having an average thickness of h1' smaller than h3', from the end of the electrode active material layer to any point between 4 and 5 mm toward the center of the electrode active material layer, and the H2 region having an average thickness of h2' which has an increased thickness increased from the endpoint of the H1 region to any point between 8 to 9 mm from the end of the electrode active material layer, and which is greater than h1', may be formed.

Thereafter, as described above, the electrode active material layer is rolled to have the H1 region having an average thickness of h1, the H2 region having an average thickness of h2, and the H3 region having an average thickness of h3, thereby obtaining the electrode having the electrode active material layer satisfying the above formulas (1) and (2).

In this case, the average thickness of the H3 region may be the average thickness for the remaining sections of the electrode active material layer, for example, the average thickness of the electrode active material layer with respect to the center of the electrode, but may be the average thickness of a region in which the endpoint of the H2 region is a starting point and any one point of 13 mm or more from the end of the electrode active material layer, in detail, any one point between 13 and 15 mm is an end point.

As described above, the electrode obtained by the present embodiment may have a stepped thickness profile, and for example, the H1 region and the H2 region may be inclined sections having different inclinations. On the other hand, the H3 region may be a flat section, and may also include an inclined section in which the thickness increases toward the center of the electrode active material layer.

The electrode according to an embodiment may also be manufactured by a third method of manufacturing a multi-layer electrode.

First, a coating layer is formed by running the electrode current collector and applying the electrode slurry as described above to at least one surface of the electrode current collector. In this case, the electrode slurry may be applied to a portion of the electrode current collector to form a coating layer to have an uncoated region, and the uncoated portion may be provided at one end of the electrode current collector.

In this case, the coating is a multi-coating, and is performed, for example, by applying a first electrode slurry containing an electrode active material to at least one surface of the electrode current collector to form a first coating layer, or form a first coating layer and an uncoated region, and by applying a second electrode slurry containing an electrode active material on the first coating layer.

The electrode slurries forming the first and second coating layers may be the same or different, and for example, the second electrode slurry may change the electrode active material of the first electrode slurry or the composition of the binder, and may change the content. Furthermore, the thickness of the first coating layer and the thickness of the second coating layer may be different. On the other hand, the solvents of the electrode slurries may also be different, but the same may be more preferable.

The formation of the second coating layer may be performed simultaneously or continuously while forming the first coating layer, and if it is before the solvent of the second coating layer is dried, the second coating layer may be formed on the first coating layer at a time interval. Furthermore, an additional coating layer may also be formed on the second coating layer.

However, to reduce the loading amount of the electrode side to prevent a problem such as electrode cracking, the second coating layer may be formed to have the width narrower than that of the first coating layer such that one end of the first coating layer is exposed. Accordingly, the H1 region by the exposure of the first coating layer, and the H3 region provided by the second coating layer, may be formed, and the end-surface profile of the step shape may be formed.

For example, when the average thickness of the first coating layer formed on the electrode current collector is h1", by continuously forming the second coating layer such that the end of the first coating layer is exposed after the first coating layer is formed, the H1 region having an average thickness of h1" may be formed, and the second coating layer may be formed on the first coating layer, thereby forming the H3 region having an average thickness of h3", which is greater than that of the H1 region.

On the other hand, a portion of the second electrode slurry located at the distal end of the second coating layer moves to the first electrode slurry of the first coating layer, and as a result, the H2 region having an average thickness of h2" in which the thickness is partially further increased than h1" of the H1 region may be formed by forming a thickness change section. In this case, the H2 region may be an inclined section in which the thickness increases from the H1 region toward the H3 region.

The fat edge phenomenon occurs at the end of the coating layer, for example, at a width of usually within 5 mm from the boundary (0 mm) between the coating layer and the uncoated region. In addition, if the thickness of the coating layer within 4 to 5 mm from the end of the first coating layer toward the center is thick, the pressure applied due to the bending of the rolling roll during the rolling process by the rolling roll is increased, and this causes cracking at the electrode edge.

Therefore, it may be preferable that a width of within 5 mm, in detail, within 4 mm, from the end of the first coating layer, for example, from the boundary between the uncoated region and the first coating layer, is exposed. On the other hand, if the second coating layer is formed such that the width at which the distal end of the first coating layer is exposed exceeds 5 mm, lithium may be precipitated during charging and discharging of the battery. Therefore, by forming the width of the second coating layer narrow such that the end of the first coating layer is exposed, the ends of the two coating layers do not overlap, thereby suppressing the fat edge phenomenon due to an increase in the side loading amount of the coating layer, and by having the H2 region partially increased in thickness as compared to the H1 region, the deposition of lithium on the electrode surface during the charging/discharging process of the battery may be suppressed.

In forming the second coating layer, although not limited thereto, a second electrode slurry for the formation of the second coating layer may be applied such that the end of the second coating layer is located at any point between 6 to 8 mm from the end of the first coating layer toward the center. Thereby, an H2 region having an endpoint of the H1 region as a starting point and any one point between 8 and 9 mm from the end of the first coating layer as an end point may be obtained.

Thereafter, the first and second coating layers are dried and rolled at the same time, thereby obtaining an electrode including an electrode active material layer that includes an H1 region having an average thickness of h1, an H2 region having an average thickness of h2 and having a slope in which the thickness increases from the end of the electrode active material layer toward the center, and an H3 region having an average thickness of h3.

The drying and rolling are the same as those described above, and a detailed description thereof will be omitted.

By forming the second coating layer such that one end of the first coating layer is exposed as described above, the thickness profile of the electrode active material layer is changed, and thus, an electrode having an electrode active material layer satisfying formulas (1) and (2) may be obtained.

As a detailed example of the third method, a first electrode slurry containing an electrode active material is applied to at least one surface of an electrode current collector to form a first coating layer, in detail, form a first coating layer and an uncoated region, and then, a second coating layer is formed by applying a second electrode slurry containing an electrode active material onto the first coating layer.

In this case, the second coating layer is formed such that at least one side end of the first coating layer up to any one point between 4 and 5 mm from the boundary of the first coating layer and the uncoated region is exposed, and thus, the H1 region having an average thickness of h1" to which the first coating layer is exposed, the H3 region having an average thickness of h3" by the formation of the second coating layer, and the H2 region having an average thickness of h2" in which the thickness of the second coating layer from the boundary between the exposed surface of the first coating layer and the second coating layer to any point between 8 to 9 mm from the end of the first coating layer increases, may be formed.

Thereafter, the first coating layer and the second coating layer are dried simultaneously to form an electrode active material layer, and the electrode active material layer is rolled, thereby obtaining an electrode having the electrode active material layer which includes the H1 region having an average thickness of h1, the H2 region having an average thickness of h2 and having an increased thickness increasing from the end of the electrode active material layer toward the center, and the H3 region having an average thickness of h3, and which satisfies Formulas (1) and (2).

In this case, the thickness of the H3 region may be the average thickness of the remaining section of the electrode active material layer, for example, the average thickness of the electrode active material layer with respect to the center of the electrode, but may be an average thickness of a region in which an endpoint of the H2 region is a starting point and any one point of 13 mm or more from the end of the electrode active material layer, in detail, any one point between 13 and 15 mm is an endpoint.

As described above, the electrode obtained by the present embodiment may have a stepped thickness profile, but the configuration thereof is not limited thereto. For example, the H1 region and the H2 region may be inclined sections having different inclinations. On the other hand, the H3 region may be a flat section, and may also include an inclined section in which the thickness increases toward the center of the electrode active material layer.

As described above, according to the method of manufacturing an electrode according to an embodiment, an electrode having a locally reduced amount of side loading of the electrode may be obtained by changing the thickness profile by the method of changing the thickness profile by blading and the method of manufacturing the multilayer electrode, and when having has a thickness profile in which the edge thickness of the electrode active material layer satisfies the formulas (1) and (2) defined in the present disclosure, the generation of the fat edge may be prevented, and the problem of deterioration in productivity due to breakage during the manufacturing process of the electrode may be prevented, and furthermore, the problem of deterioration in battery performance due to lithium precipitation during battery driving may be prevented.

The electrode and the electrode manufacturing method provided in the present disclosure are not particularly limited, and may be applied to any one of the negative electrode and the positive electrode, and in more detail, the negative electrode may also prevent problems such as lithium deposition on the surface of the negative electrode.

A battery may be manufactured by using the electrode provided in the present disclosure as a negative electrode or a positive electrode and preparing an electrode assembly in which a separator is interposed between the negative electrode and the positive electrode.

In this case, the electrode assembly may be a stack type electrode assembly, a stacked/folding type electrode assembly, or wound type electrode assembly, and the uncoated portion of each electrode may be aligned on at least one side end of the electrode assembly. In addition, the wound-type electrode assembly may have the uncoated portion on at least one of both side ends in the width direction with respect to the winding direction.

EXAMPLE

Hereinafter, examples of the present disclosure will be described in more detail by way of Examples. However, the following examples illustrate detailed examples of the present disclosure, and are not intended to limit the present disclosure thereby.

Example 1

A negative electrode slurry was prepared by adding 100 parts by weight of a negative active material in which natural graphite and artificial graphite are mixed in a predetermined ratio, 5 parts by weight of a graphite-based conductive agent, 1.2 parts by weight of carboxymethyl cellulose, and 1.5 parts by weight of styrene-butadiene rubber.

The negative electrode slurry was uniformly applied to a copper thin film having a thickness of 6 μm at an application amount of 11 mg/cm$^2$.

A portion of the coating layer was removed to a point of 8 mm from the end of the coating layer on which the negative electrode slurry was coated, by blading. In this case, with respect to the region to a point of 5 mm from the end of the coating layer, 25 to 35% of the coating layer was partially removed with respect to the thickness of the coating layer.

A final negative electrode was prepared by passing through a hot air drying furnace having a temperature of 110° C. after blading and then rolling the negative electrode active material layer using a roll press rolling facility.

As illustrated in Table 2, the average thickness was measured at intervals of 1 mm for the widthwise end portion (the region from the end of the negative electrode active material layer to 15 mm toward the center) of the obtained negative electrode, and the results are illustrated in Tables 2 and 3.

After setting the point from the end of the negative electrode active material layer to 5 mm as the H1 region, the point to 8 mm as the H2 region, and the point to 13 mm as the H3 region, the average thicknesses h1, h2, and h3 of the H1, H2 and H3 regions were calculated using the results in Table 2, respectively, and the values of Formula (1) of h1/h2 and Formula (2) of h2/h3 were calculated and illustrated in Table 3.

In addition, after the rolling process, the side cracks of the negative electrode active material layer were observed, and the results are illustrated in Table 3, and an image of the negative electrode surface was captured, and illustrated in FIG. 4.

Further, a lithium secondary battery was prepared using the obtained negative electrode, and then charged and discharged under the conditions illustrated in Table 1 below.

TABLE 1

| Charging (CC-CV) | 0.5 C., 4.2V/0.05 C. cut-off |
| Rest | 5 min |
| Discharge (CC) | 0.7 C., 2.5 V |
| Rest | 5 min |
| Charging (CC-CV) | 0.7 C., 3.7 V/0.05 C. cut-off |
| Rest | 5 min |

Thereafter, it was observed whether lithium was deposited on the surface of the negative electrode, the results are illustrated in Table 3, and the electrode surface was photographed and illustrated in FIG. 4.

Example 2

The same negative electrode slurry as in Example 1 was uniformly applied to a copper thin film having a thickness of 6 μm at an application amount of 11 mg/cm$^2$, and passed through a hot air drying furnace having a temperature of 110° C., to form a negative electrode active material layer.

A portion of the negative electrode active material layer was removed by blading from the end of the negative electrode active material layer to a point of 8 mm. In this case, in the region from the end of the negative electrode active material layer to a point of 5 mm, 25 to 35% of a negative electrode active material layer portion with respect to the thickness of the negative active material layer was removed.

A final negative electrode was prepared by rolling the negative electrode active material layer using a roll press rolling facility.

With respect to the obtained negative electrode, the average thickness was measured at intervals of 1 mm with respect to the edge in the width direction in the same manner as in Example 1, and is illustrated in Tables 2 and 3, and the average thicknesses h1, h2 land h3 for the H1 region, H2 region and H3 region, respectively, and the values of Formulas (1) and (2) were obtained and illustrated in Table 3.

In addition, it was observed whether the side cracks of the negative electrode active material layer after the rolling process occurred, and the results are illustrated in Table 3.

Furthermore, after manufacturing a lithium secondary battery using the obtained negative electrode, it was charged and discharged under the same conditions as in Example 1 to observe whether lithium was deposited on the surface of the negative electrode, and the results are illustrated in Table 3.

Example 3

The same negative electrode slurry as in Example 1 was used to form a first coating layer on a copper thin film having a thickness of 6 μm. Thereafter, a second coating layer was formed on the first coating layer using the same negative electrode slurry as the first coating layer. In this case, the first coating layer and the second coating layer were formed to have the same thickness, and the end of the second coating layer was positioned at a point 8 mm from the end of the first coating layer.

Thereafter, after passing through a hot air drying furnace having a temperature of 110° C., the negative electrode active material layer was rolled using a roll press rolling facility to prepare a final negative electrode.

With respect to the obtained negative electrode, the average thickness was measured at intervals of 1 mm with respect to the end in the width direction in the same manner as in Example 1, and is illustrated in Tables 2 and 3, and the average thicknesses h1, h2 and h3 for the H1 region, H2 region and H3 region, and the values of Formula (1) and Formula (2) were obtained and illustrated in Table 3.

In addition, it was observed whether the side cracks of the negative electrode active material layer after the rolling process occurred, and the results are illustrated in Table 3.

Furthermore, after manufacturing a lithium secondary battery using the obtained negative electrode, it was charged and discharged under the same conditions as in Example 1 to observe whether lithium was deposited on the surface of the negative electrode, and the results are illustrated in Table 3.

Comparative Example 1

The same negative electrode slurry as in Example 1 was uniformly applied to a copper thin film having a 6 μm thick, passed through a hot air drying furnace having a temperature of 110° C., and then the negative electrode active material layer was rolled using a roll press rolling facility to prepare a final negative electrode.

With respect to the obtained negative electrode, the average thickness was measured at intervals of 1 mm with respect to the end in the width direction in the same manner as in Example 1, and is illustrated in Tables 2 and 3, and the average thicknesses h1, h2 and h3 for the H1 region, H2 region and H3 region, and the values of Formulas (1) and (2) were obtained and illustrated in Table 3.

In addition, after the rolling process, side cracks of the anode active material layer were observed, and the results are illustrated in Table 3, and an image of the electrode surface was captured and illustrated in FIG. 4.

Furthermore, after manufacturing a lithium secondary battery using the obtained negative electrode, it was charged and discharged under the same conditions as in Example 1 to observe whether lithium was deposited on the surface of the negative electrode, and the results are illustrated in Table 3.

Comparative Example 2

To reduce side loading, after inserting a chamfer in the edge of the coating shim of the copper thin film having a thickness of 6 μm, the same negative electrode slurry as in Example 1 was applied, and passed through a hot air drying furnace having a temperature of 110° C., and a final negative electrode was prepared by rolling the negative electrode active material layer using a roll press rolling facility.

With respect to the obtained negative electrode, the average thickness was measured at intervals of 1 mm with respect to the end in the width direction in the same manner as in Example 1, and is illustrated in Tables 2 and 3, and the average thicknesses h1, h2 and h3 for the H1 region, H2 region and H3 region, and the values of Formula (1) and Formula (2) were obtained and illustrated in Table 3.

In addition, it was observed whether the side cracks of the negative electrode active material layer after the rolling process occurred, and the results are illustrated in Table 3.

Furthermore, by using the obtained negative electrode, lithium precipitation was observed in the same manner as in Example 1, and the results are illustrated in Table 3 and FIG. 4.

TABLE 2

| Classification Location (mm) | Average Thickness (μm) | | | | |
| --- | --- | --- | --- | --- | --- |
| | Example 1 | Example 2 | Example 3 | Comparative Example 1 | Comparative Example 2 |
| 0 | 37.8 | 39.8 | 31.8 | 52.9 | 30.8 |
| 1 | 42.4 | 43.7 | 40.9 | 59.3 | 37 |
| 2 | 45.1 | 46.55 | 41.45 | 62.75 | 41.1 |
| 3 | 47.8 | 49.4 | 42 | 66.2 | 45.2 |
| 4 | 53.8 | 55.1 | 43.8 | 71.2 | 52.8 |
| 5 | 62.8 | 61.8 | 51.4 | 75.1 | 59.9 |
| 6 | 73.4 | 74.4 | 72.4 | 77.4 | 65.9 |
| 7 | 79.6 | 78.6 | 81.1 | 79.4 | 70.8 |
| 8 | 83.7 | 82.1 | 83.7 | 81.5 | 75.9 |
| 9 | 84.2 | 84.1 | 83.9 | 83.1 | 79.6 |
| 10 | 85.1 | 85.4 | 84.5 | 84.4 | 83.9 |
| 11 | 85.3 | 84.5 | 86.1 | 85.8 | 85.1 |
| 12 | 85.6 | 85.2 | 86.5 | 86.2 | 87.6 |
| 13 | 85.9 | 85.1 | 87.8 | 86.3 | 89.2 |
| 14 | 86.1 | 85.3 | 87.9 | 86.2 | 89 |
| 15 | 85.8 | 85.2 | 87.8 | 86.3 | 89.1 |

TABLE 3

| Classification | Example 1 | Example 2 | Example 3 | Comparative Example 1 | Comparative Example 2 |
| --- | --- | --- | --- | --- | --- |
| h1 (μm) | 48.3 | 49.4 | 41.9 | 64.6 | 44.5 |
| h2 (μm) | 80.2 | 79.8 | 80.3 | 80.4 | 73.1 |
| h3 (μm) | 85.5 | 85.1 | 86.2 | 85.7 | 86.5 |
| h1/h2 | 0.60 | 0.62 | 0.52 | 0.80 | 0.61 |
| h2/h3 | 0.94 | 0.94 | 0.93 | 0.94 | 0.84 |
| Side Cracking | × | × | × | ○ | × |
| Li Precipitation | × | × | × | × | ○ |

As illustrated in Table 3 above, the negative electrodes of Examples 1, 2, and 3 satisfy all of the values of Formulas (1) and (2) in the present disclosure, and in performing the rolling process, there was no problem of cracking of negative electrode active material layer or lithium precipitation.

Figure 3:
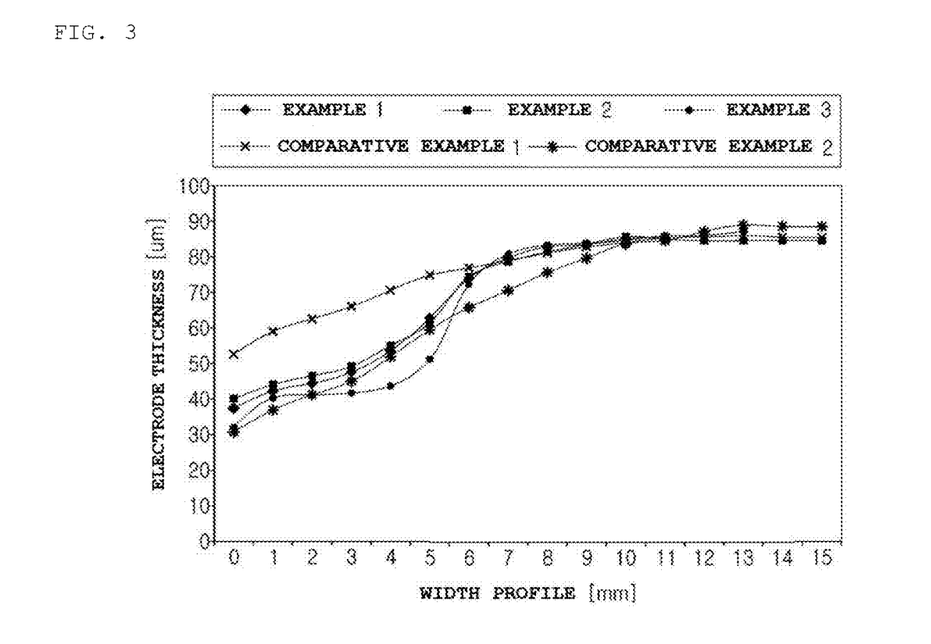
FIG. 3 is a graph illustrating measured thicknesses of end surfaces of electrodes manufactured by Examples and Comparative Examples measured.
Figure 4A:
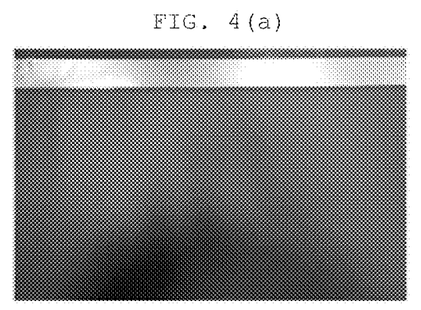
Figure 4B:
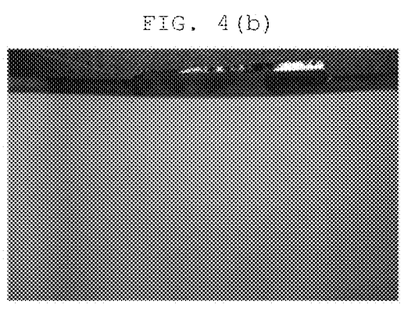
Figure 4C:
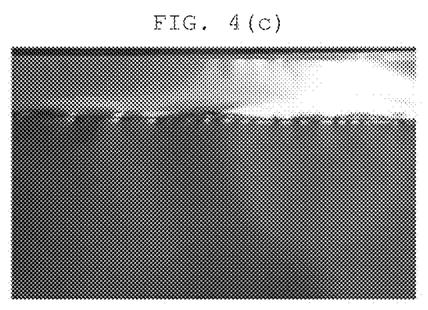
Figure 4D:
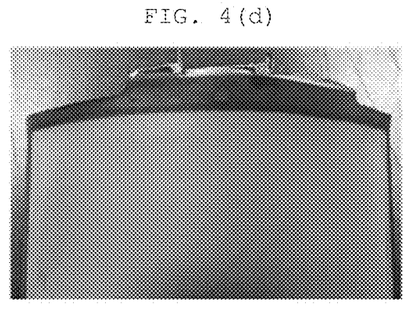

Meanwhile, as can be seen from Table 2, the negative electrode prepared in Comparative Example 1 satisfies the range of Formula (2), but does not satisfy the range of Formula (1), and as can be seen from FIG. 3, it can be appreciated that a high side loading amount is illustrated at the side end of the negative electrode. For this reason, as illustrated in FIG. 4, a cracking phenomenon was confirmed on the side of the negative electrode active material. On the other hand, when the surface of the rolling roll subjected to the rolling process for manufacturing the electrode was checked, the surface of the roll was contaminated. This occurred because the negative electrode had a high side-loading amount and the pressure was increased on the electrode side due to the bending of the side portion of the rolling roll, such that the component of the electrode active material layer was transferred to the rolling roll, and therefore, it was required that the electrode manufacturing process was stopped and the rolling roll was cleaned.

On the other hand, as can be seen from Table 2, the negative electrode prepared in Comparative Example 2 satisfies the range of Formula (1), but does not satisfy the range of Formula (2). For this reason, no side cracking occurred in the rolling process during electrode manufacturing, but as illustrated in FIG. 4, it can be confirmed that a light gray film is formed due to lithium precipitation on the electrode surface after charging and discharging of the electrode.

As set forth above, according to an embodiment, in manufacturing a high-density electrode, the quality of the electrode may be improved by designing the electrode active material layer in a step shape or by locally controlling the loading amount of the side to suppress the occurrence of a fat edge, and the rolling processability at the time of manufacturing electrodes may be improved by suppressing contamination on the surface of the rolling roll, and furthermore, the productivity of the electrode manufacturing may be secured.

In addition, according to an embodiment, by locally controlling the loading amount of the side, cracking of the electrode side caused by a relatively high loading amount on the side of the electrode during the rolling process may be prevented.

Furthermore, when the electrode obtained by an embodiment of the present disclosure is used, the problem of lithium precipitation during the charging and discharging process of the battery may be suppressed, and the cell performance may be improved, and the safety of the battery may be improved.

Furthermore, by using the electrode according to an embodiment of the present disclosure, a high energy density cell may be implemented.

While this disclosure includes detailed examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electrode for a secondary battery, comprising:
an electrode current collector; and
an electrode active material layer formed on at least one surface of the electrode current collector,
wherein the electrode active material layer comprises an H1 region, an H2 region and an H3 region sequentially provided from an end of the electrode active material layer toward a center,
the H2 region comprises an inclined section in which a thickness increases from the H1 region toward the H3 region,
the H1 region is a region having the end of the electrode active material layer as a starting point, and any one point between 4 and 5 mm from the starting point as an endpoint, the H2 region is a region having an endpoint of the H1 region as a starting point, and any one point between 8 and 9 mm from the end of the electrode active material layer as an endpoint, and the electrode satisfies the following formulas (1) and (2), $$0.2 \leq h1/h2 \leq 0.7 \tag{1}$$

$$h2/h3 \geq 0.9 \tag{2},$$

where h1 is an average thickness of the H1 region, h2 is an average thickness of the H2 region, and h3 is an average thickness of the H3 region.

2. The electrode for a secondary battery of claim 1, wherein the H3 region is a region having an endpoint of the H2 region as a starting point, and any one point between 13 and 15 mm from the end of the electrode active material layer as an endpoint.

3. The electrode for a secondary battery of claim 1, wherein the H1 region comprises a distal end inclined portion on which a thickness of the electrode active material layer increases, on the end of the electrode active material layer.

4. The electrode for a secondary battery of claim 3, wherein the distal end inclined portion is provided within 2 mm from the end of the electrode active material layer.

5. The electrode for a secondary battery of claim 1, further comprising an uncoated portion on the electrode current collector, wherein the end of the electrode active material layer is a boundary between the electrode active material layer and the uncoated portion.

6. The electrode for a secondary battery of claim 1, wherein the electrode is a negative electrode.

7. An electrode for a secondary battery, comprising:

an electrode current collector; and an electrode active material layer formed on at least one surface of the electrode current collector, wherein the electrode active material layer comprises an H1 region, an H2 region and an H3 region sequentially disposed from an end of the electrode active material layer toward a center, the H1 region is a region having the end of the electrode active material layer as a starting point, and any one point between 4 and 5 mm from the starting point as an endpoint, the H2 region is a region having an endpoint of the H1 region as a starting point, and any one point between 8 and 9 mm from the end of the electrode active material layer as an endpoint, and the following formulas (1) and (2) are satisfied, $$0.2 \leq h1/h2 \leq 0.7 \tag{1}$$

$$h2/h3 \geq 0.9 \tag{2},$$

where h1 is an average thickness of the H1 region, h2 is an average thickness of the H2 region, and h3 is an average thickness of the H3 region.

8. The electrode for a secondary battery of claim 7, wherein the H3 region is a region having an endpoint of the H2 region as a starting point and any one point between 13 and 15 mm from the end of the electrode active material layer as an endpoint.

9. The electrode for a secondary battery of claim 7, wherein the H2 region comprises an inclined section in which a thickness of the electrode active material layer increases toward the H3 region.

10. The electrode for a secondary battery of claim 7, wherein the H1 region comprises a distal end inclined portion on which a thickness of the electrode active material layer increases, on the end of the electrode active material layer.

11. The electrode for a secondary battery of claim 7, wherein the electrode is a negative electrode.

12. A secondary battery comprising:

an electrode assembly comprising a negative electrode; a positive electrode; and a separator interposed between the negative electrode and the positive electrode, wherein at least one of the positive electrode and the negative electrode is the electrode of claim 1.

13. The secondary battery of claim 12, wherein the electrode assembly is a stacked electrode assembly, stacked and folded electrode assembly, or wound electrode assembly, and is provided with an uncoated portion of each electrode aligned on at least one side end of the electrode assembly.

14. The secondary battery of claim 12, wherein the electrode assembly is a wound electrode assembly, and the electrode has the uncoated portion on at least one of both side ends in a width direction with respect to a winding direction.

* * * * *